(12) United States Patent
Pettersson

(10) Patent No.: US 8,290,733 B2
(45) Date of Patent: Oct. 16, 2012

(54) MODULAR CALIBRATION

(75) Inventor: Bo Pettersson, London (GB)

(73) Assignee: Hexagon Metrology AB, Nacka Strand (SE)

( * ) Notice: Subject to any disclaimer, the term of this patent is extended or adjusted under 35 U.S.C. 154(b) by 408 days.

(21) Appl. No.: 12/207,250

(22) Filed: Sep. 9, 2008

(65) Prior Publication Data

US 2009/0082986 A1    Mar. 26, 2009

(30) Foreign Application Priority Data

Sep. 26, 2007  (EP) .................................... 07117240

(51) Int. Cl.
*G01D 18/00*    (2006.01)
(52) U.S. Cl. .......................................... 702/95; 73/1.01
(58) Field of Classification Search ................ 702/90, 702/95
See application file for complete search history.

(56) References Cited

U.S. PATENT DOCUMENTS

| 4,945,501 | A | * | 7/1990 | Bell et al. .................... 702/95 |
| 5,594,668 | A | | 1/1997 | Bernhardt et al. |
| 6,941,192 | B2 | * | 9/2005 | Tang et al. .................... 700/254 |
| 7,124,047 | B2 | * | 10/2006 | Zhang et al. .................. 702/104 |
| 7,519,499 | B2 | * | 4/2009 | Skinner ........................ 702/150 |
| 2002/0087233 | A1 | | 7/2002 | Raab |
| 2007/0051179 | A1 | * | 3/2007 | McMurtry et al. .............. 73/760 |

FOREIGN PATENT DOCUMENTS

WO    2006/114603    11/2006

* cited by examiner

*Primary Examiner* — Edward Raymond
(74) *Attorney, Agent, or Firm* — Pearne & Gordon LLP

(57) ABSTRACT

A modular calibration method for a CMM, comprising preliminary calibration steps of several components prior to its mounting. The preliminary calibration steps yield specific mapping information for each calibrated component, which are then stored into map files generated and associated to the calibrated components. A final alignment takes place after once the CMM is mounted, which processes mapping information gathered during the preliminary calibration steps.

13 Claims, 4 Drawing Sheets

MODULAR CALIBRATION

REFERENCE DATA

This application claims priority from European Patent Application EP07117240 filed on Sep. 26, 2007, whose content is hereby incorporated by reference.

FIELD OF THE INVENTION

The present invention relates to a calibration method for a coordinate measuring machine (CMM), and a computer-readable medium therefore.

DESCRIPTION OF RELATED ART

Calibration methods are meant to ensure the accuracy of measurement tools by providing a preliminary reliability check. Generally speaking, calibration consists in comparing measurement outputs to known references values. When discrepancies are noticed between the two sets of values, an error correction is carried out, so that the actual measured value and the known theoretical values are aligned. The calibration step is usually performed prior to the first use of a system, in order to make sure that it is delivers the right values when used. It can be then repeated at major overhauls.

In the CMM domain, machines usually have at least three degrees of freedom (a.k.a. DOF). Systems with six or more DOF are however known. CMM systems usually comprise a support moving linearly according to the three axis of space X, Y, Z and a stylus of lighter weight attached to it, that is moveable in rotation, for example by the interposition of an articulated probe head. The most common calibration processes consists in measuring coordinates over a so-called calibration artefact that is typically a sphere so that all the degrees of freedom can be simultaneously tested, i.e. as well the position and the orientation over the full range of operation of the machine.

In general, CMM systems offer a selection of measuring probes, which can be connected to the positioning head, and are specialized to the execution of different measurement tasks. A CMM could be fitted, for example, with a selection of trigger touch probes of different length and shapes, scanning probes, contactless probes, optical inspection probes, and so on. Each individual probe requires an individual and separate calibration. On the other hand, when a new probe head is introduced in the system, or whenever an element of the cinematic chain of the CMM is altered, all the probes ought to be individually recalibrated to ensure optimal precision.

The need of frequent calibration is a drawback for the user of the CMM, in that it reduces the availability of the CMM system. Furthermore, the management of the calibration data for each probe is a burden to the user of the CMM.

Another drawback of the calibration processes known from the art is that the calibration is done only on a discrete number of selected positions, so that the accuracy optimisation is not guaranteed for all positions. Furthermore, since the full global calibration operation always takes place on mounted machines, it is always difficult to identify the right sources of the major deviations since there is no way to distinguish between parameters at this stage a priori, so that the parameter weighting and adjustment is quite time-consuming.

Another issue for ensuring the precision of the calibration is to include dynamic and bending parameters, in order to know how the system reacts to forces applied on the stylus and what the influences of forces of inertia are. To this effect, it is known to include, in the calibration process, measurements of the displacement of the CMM probe as a function of the contact force, for example.

Many numeric models have been developed for error correction in order to improve the accuracy of the calibration systems. A first model, presented in U.S. Pat. No. 5,594,668, takes into account elastic properties of a probe and derives distortions due to acceleration through matrix calculations. Similarly in WO2006/114603 an inertia matrix is used and deflection forces are taken into account. Yet in both case the intrinsic elastic properties of the probe used are not derived from a preliminary calibration step, but are hard-coded based on manufacturer data, so that the precision is not individually adapted to each device.

US20020087233 describes a modular portable CMM with interchangeable probes, in which an EEPROM circuit board contains calibration and identification data for avoiding unit mix-up; nevertheless those data are not derived from any calibration operation on the probes themselves and hence do not contain any probe-specific data.

The present invention is based on the recognition of the above shortcoming of the prior art, and aims to overcome them. In particular the present invention proposes a method to reduce the impact of the calibrations on the availability of a CMM system, and to lessen the burden of managing a large set of calibration data, so that the ease of use is improved. The accuracy is improved as well since the calibration steps prior to the mounting of the machine are not generic for a given component type or model any more, but derive specific characteristics of each tested component.

BRIEF SUMMARY OF THE INVENTION

According to the invention, these aims are achieved by means of a modular calibration method for a CMM, which comprises a plurality of components, where preliminary calibration steps take place according to the appended claims.

In preferred embodiments such preliminary calibration steps are carried out prior to the step of mounting said CMM and, preferably, parts of said components are individually calibrated for each degree of freedom of said components and yield specific mapping information. The mapping information is then stored, after map files have been generated and associated to the calibrated components. A final alignment step take place after said CMM is mounted. It just processes and aligns the mapping information gathered during the preliminary calibration steps.

Such a modular approach allows to best fit to the actual intrinsic properties of each single component, each single movement and each single degree of freedom in each relative positioning reference. It hence ensures a high quality accuracy since specialized equipment can be used at production site for their calibration. It also shifts the overall optimisation complexity towards single optimisation problems, so that the computation requirements on the mounted machine, which have always been cumbersome and time-consuming, are strongly simplified. Furthermore, such a modular approach is suited for repeated calibration operations when only simple add-ons or piece exchanges need to be carried out.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

As mentioned earlier, the state of the art calibration methods for CMMs 90 are known to be cumbersome and time-consuming. Indeed, the calibration process is delicate and long because several calibration parameters have to be adjusted simultaneously. In the general case involving translation and rotation DOF, each position of the calibration probe can be obtained by several configurations of the CMM, each requiring a separate calibration. Due to the time-consuming character of the optimisation process in order to ensure the best accurate tuning, usually only a limited number of points in the configuration space of the machines are calibrated, and calibration data relative to the remaining configuration are obtained by interpolation. The sparseness of the calibration points limits the precision of this technique.

The modular calibration method according to the invention is meant to improve the accuracy of the machine calibration settings while providing single individual calibrations of components prior to the mounting of the probe, and using this information once the machine is mounted. This way, the complex optimisation problem is split into single optimisation problems that can better be handled with specific quality machines for each component, e.g. at their own production site. The calibration procedure on the mounted CMM, consisting in aligning all available calibration information gathered in the previous individual calibration procedures is thus much simpler. On one hand, the use of specific tailored calibration information yielded by individual testing procedures for each component allows to improve the overall calibration accuracy, since the calibration can cover optimally the configuration space of each single component; on the other hand, it provides more scalability and improved availability of the system, because a component swap or exchange is possible without needing to go through an overall calibration procedure again.

According to one aspect of the invention, a CMM system is considered as a combination of simple components, for example a moving platform in a XYZ three-dimensional reference, an orientable probe head having one or two rotation axes, probes and accessories, like touch trigger probes, styli, and lengthening elements, out of a set of compatible interchangeable elements. Some of the components are active elements, corresponding to degrees of freedom in the CMM system and include preferably, for each DOF, an actuator to set the DOF and an encoder to read its position out.

Figure 4:
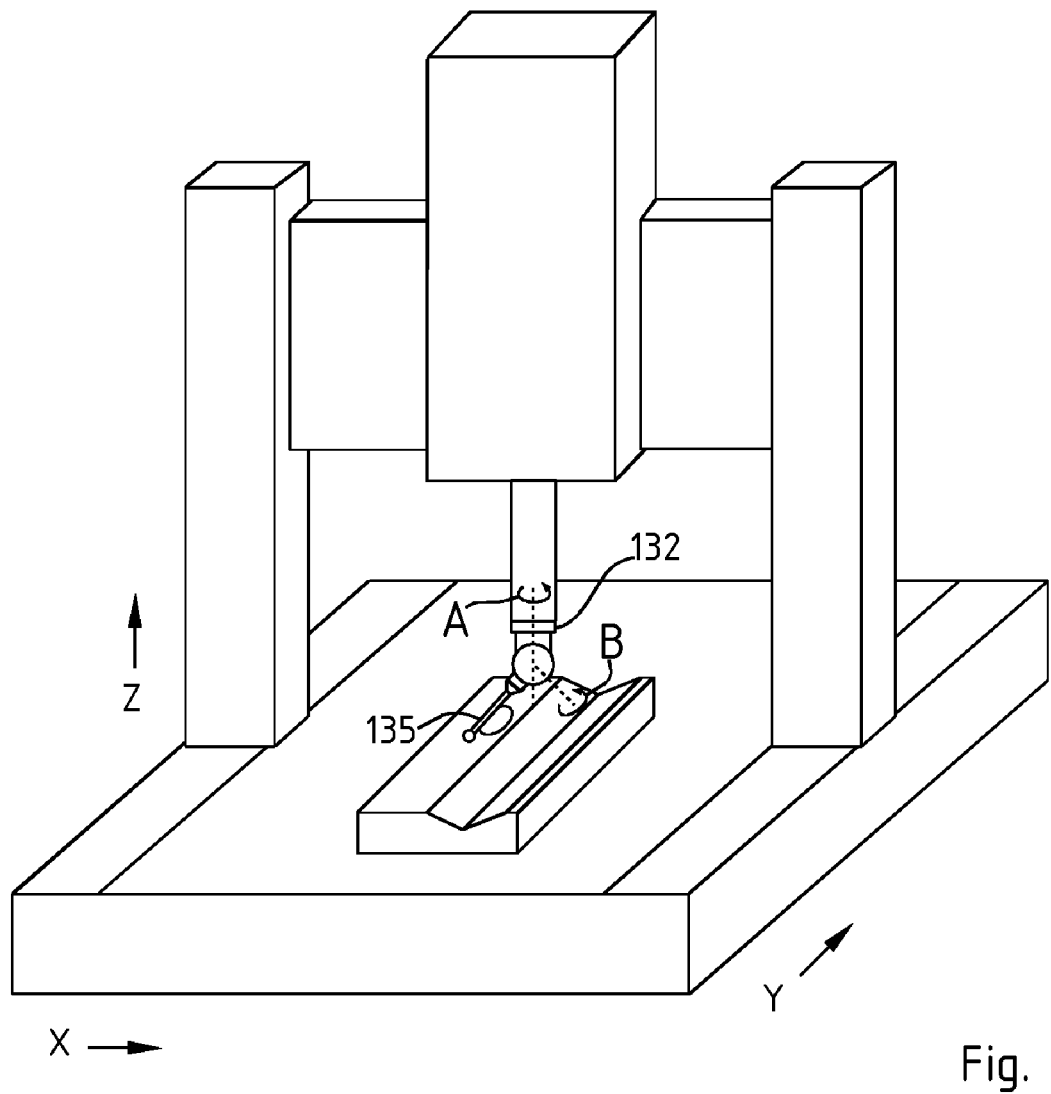
FIG. 4 shows a CMM system equipped with a rotary head and a touch probe, used to illustrate the terminology of the description of the invention.

In a general way, the CMM system can be decomposed in an ensemble of single components, which define a complex cinematic chain. For example, a CMM measuring system fitted with a rotary head and a touch probe, as shown in example FIG. 4 could be formally decomposed into:

a. a linear actuator and encoder corresponding to the translation along the horizontal "Y" axis;
   b. a linear actuator and encoder corresponding to the translation along the horizontal "X" axis;
   c. a linear actuator and encoder corresponding to the translation along the vertical "Z" axis;
   d. a rotary actuator and encoder corresponding to the rotation about the vertical "A" axis of the wrist of the probe
   e. a rotary actuator and encoder corresponding to the rotation about the horizontal "B" axis of the wrist of the probe;
   f. a fixed translation corresponding to the stylus 135 in use The combination of each elementary subsystem a)-f) determines the coordinate and the orientation of the sensed point. Each one of those subsystems has a specific orientation in a relative reference. The presented example shows, for the sake of simplicity, a cinematic serial chain, i.e. a chain of actuators which are connected one after the other. The invention, however, is not limited to this case, and also comprises the case of parallel actuators, like for example a six-axis Stewart platform.

The presented CMM system comprises, beyond the three-axis XYZ actuators, a plurality of modular components, for example the rotary head 132 and the stylus 135. Depending from the task to be performed, the CMM system can be fitted, with a combination of components chosen from a modular set. The decomposition of the cinematic chain in subsystem can correspond to a detachable or modular component of the overall system, but this is in no way a requirement of the invention. The rotary head 132, for example is decomposed in two independent elementary systems, corresponding to its independent degrees of freedom.

As mentioned in the introduction, the calibration of such a complex measuring machine is time-consuming and delicate, and must be repeated every time the machine's configuration is altered. When the measuring system is decomposed in subsystems, however, and each subsystem is individually calibrated, a global calibration can be obtained by composition of the individual calibrations.

Formally, the configuration of the CMM system is fully determined by a set of parameters, including, for example, displacements and rotation angles relative to the various degrees of freedom, plus eventually the temperature and other global parameters. The static calibration of the CMM system can be regarded as a correspondence, or map M, $$\bar{X} = M(\Xi) \tag{1}$$

between the parameter space of the CMM system (whose elements are represented by vectors of parameters $\Xi = \xi_1$, $\xi_2, \ldots \xi_n$, the values of $\xi$ being usually known from the encoders of the CMM system) and $\bar{X}$ the actual position of the measured point, for example in a Cartesian coordinate system $\bar{X} = (x, y, z)$. This is obtained, in a conventional way, by measuring a set of reference points, or the surface of a reference object, and by known numeric error minimization techniques. The present invention deals with a process of constructing a global calibration M, by a set of subsystem calibration.

In the simple but very common case in which the kinematical chain of the CMM system is fully serial, one can consider each degree of freedom as independent subsystem, and construct M as a composition of correspondences $M_j(\xi_j)$, each one corresponding to a degree of freedom $$M = M_1(\xi_1) \cdot M_2(\xi_2) \cdot \ldots \cdot M_n(\xi_n) \tag{2}$$

In a more general case, the submaps $M_j$ may depend of one or more parameters of the machine to qualify each component relatively to the reference space of the CMM, each default can induce relative reference changes in the cinematic chain. The calibration needs not be limited to a static correspondence, put also include dynamic effect, thus introducing a dependence from velocities $\dot{\xi}$, accelerations $\ddot{\xi}$, and the masses of the various elements. In all these cases, the global calibration function can be computed, from single calibrations of the subsystems.

Figure 1:
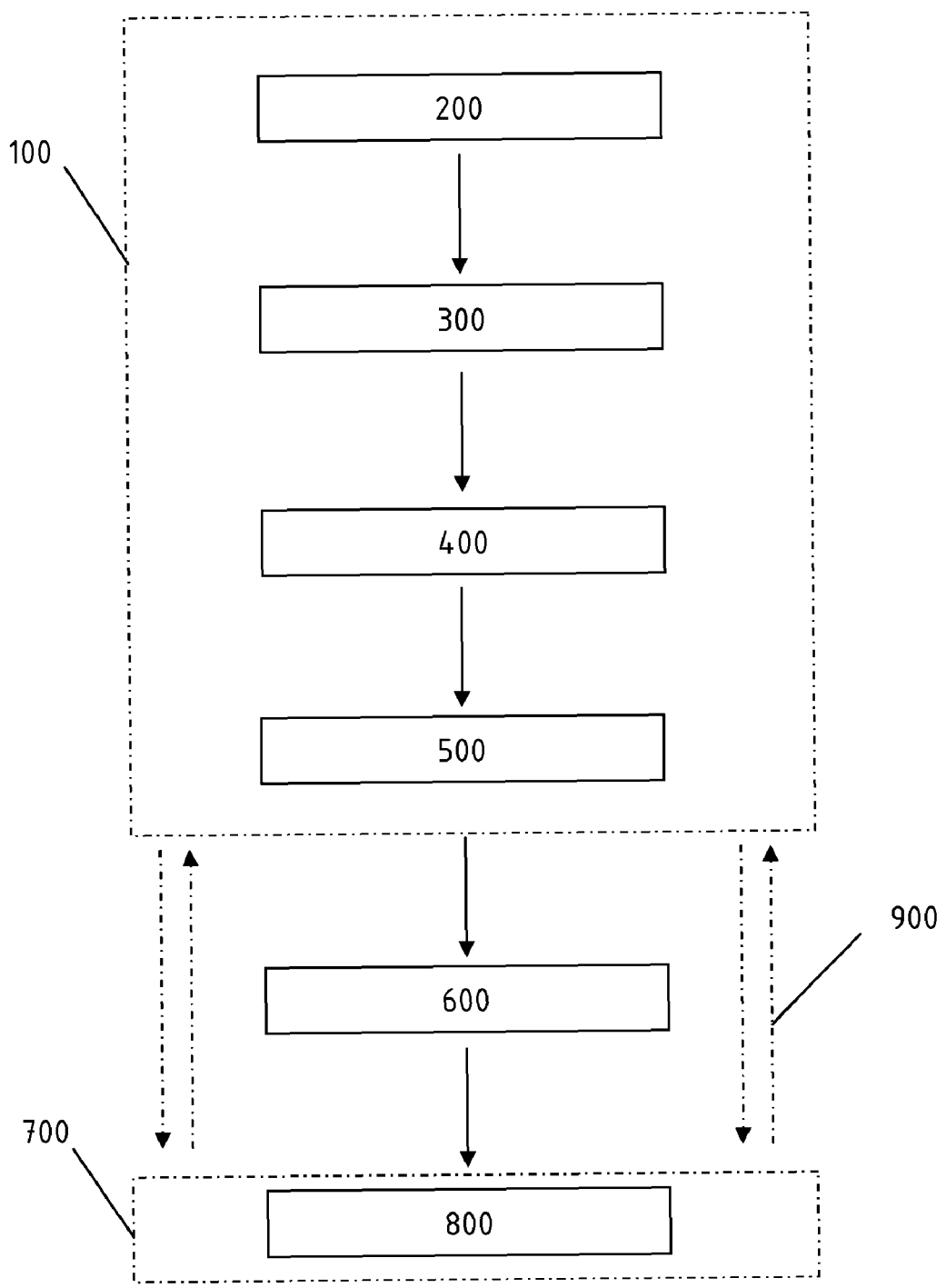
FIG. 1 shows a sequence diagram of the calibration steps according to a preferred embodiment of the invention.

FIG. 1 illustrates the overall concept of the invention through a sequence diagram of a preferred embodiment. In the diagram, the two dotted boxes 100 and 700 stand respectively for the set of steps taking place before the CMM is mounted and after the CMM is mounted, and the dotted arrows 900 stand for a mutual information exchange between those two sets of steps, since the step or steps after the mounting use information precisely provided by the steps prior to the mounting. The sequence of steps unfolds as follows:

200: preliminary calibration step of some subsystem or individual components making up the CMM. This individual testing can be carried out off-site, that is at a different site than the final calibration, for example in factory or at a specialized calibration center, with specific equipment in order to ensure a high level of quality for the error correction and compensation;

300: as a result of the individual testing processes, calibration information is provided, which is specific to the subsystem or individual component and not generic to all the component of the same model. According to the modular calibration method of the invention, the calibration information relative to different individual components having the same specifications (e.g. two scanning probe of the same model) can thus be different, even if only slightly, which would not be the case if only model-generic information was be stored and attached in a static manner to a piece. The output of this step is to generate a so-called map file which will be associated to the calibrated component;

According to the needs, the map file of a component can include different calibration data, for example geometric calibration data, or sensivity to deformation induce by some combination of heavy final elements as well as stiffness calibration and dynamic data, by known methods. In the case of an active element, the calibration will include several different configurations of the elements, in order to cover appropriately the element's configuration space;

400: once the individual calibration procedures have delivered an output, the yielded calibration information can be further processed and organized according to different criteria that will be discussed based on FIG. 2 further in this document;

500: the storing of calibration information. Different strategies for the storing are possible and are also discussed further in this document based on FIG. 2;

600: the combination of the elements to provide a working CMM system with a set of desired features. This step could be done manually, for example when fitting a probe on the spindle of a CMM positioning platform, or automatically, for example in the case of a system equipped with an automatic tool-changing magazine;

800: the final alignment procedure for mapping and coordinating all the calibration information. In a preferred embodiment of the invention, this step can be fully automatic, i.e. requiring no human intervention. As a result, once the different elements of the CMM are combined together, the system is "auto-calibrated" in the sense that a calibration supervisor detects the components, selects the relevant calibration files, and combines them in a system calibration file. According to another preferred embodiment for the invention, the alignment function can be semi-automatic, as explained later in this document.

Figure 2:
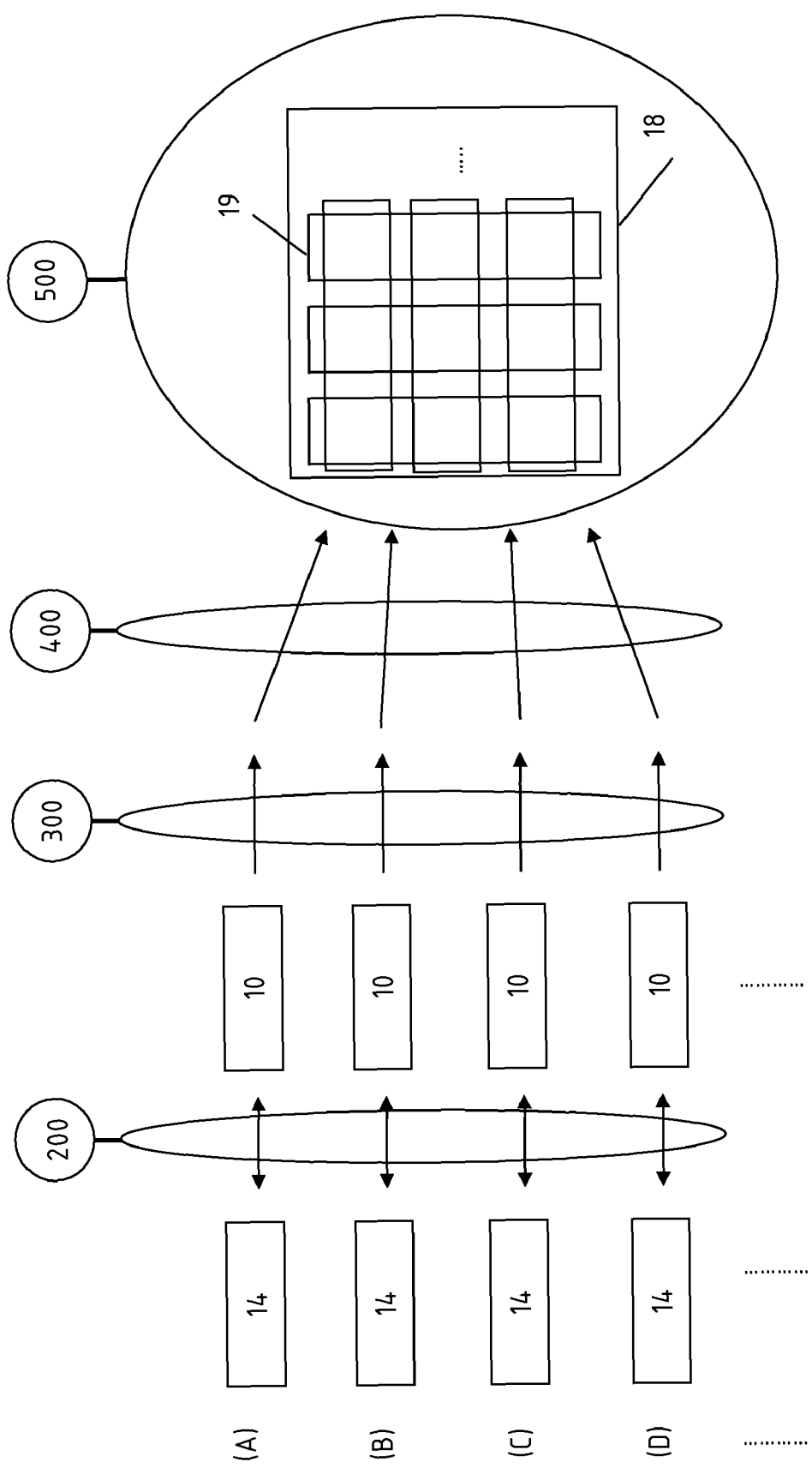
FIG. 2 shows a detailed diagram of the calibration steps prior to the CMM mounting according to a preferred embodiment of the invention.

FIG. 2 illustrates in more detail the steps prior to the mounting of the CMM according to a preferred embodiment of the invention. The subsystems 10 of the CMM system, which are further referenced according to letters A, B, C, D etc. organized in rows to distinguish between them, are preferably tested by a corresponding specialized equipment in production 14 (step 200). The calibration operation provides specific calibration data (step 300) for each subsystem or component. The calibration information can span different parameters, possibly depending on the component. It is usually distinguished between geometrical mapping, where the encoders associated to either of the 6 degrees of freedom of the machine derive the position, and stiffness mapping, where an encoder derives a position shift based on a force applied due to some bending of a component. Dynamic mapping can also be applied to a CMM in deriving a position shift based on inertia forces applied to the CMM.

It is precisely the goal of the gathering and organization step (step 400) to group the information of the map files into map sets 18 (illustrated later on FIG. 2) which are structured so that the final alignment procedure is simplified as much as possible through such pre-processing. An adequate segmentation and presentation of the calibration information further allows to perform the final alignment procedure in a modular fashion, the user being able to select what needs to be aligned and what doesn't. He can e.g. decide whether if any further mapping like stiffness or dynamic mapping should be done on top of the basic geometrical mapping. Logical calibration information maps 19 can hence be formed and stored into a set of maps 18 (step 500), from which the user will select the sets or subsets of his choice, as shown on FIG. 2.

According to the preferred embodiment disclosed in FIG. 2, the map files generated by the preliminary calibration steps 100 and associated to the subsystems are organized into matrix. The combination of each specific subsystem matrix of a component define a component matrix. Each entries of the component matrix define a reference orientation, linear parameters, rotational parameters and some others parameters such as the ones previously listed above (degrees of Freedom, stiffness mapping, dynamic mapping, this list not trying to be exhaustive). The component matrix can be optimized to define mathematical functions depending of the complexity of the component. They define exactly the dynamic behaviour of the component for each position. To gain time, single subsystem matrix is more accurate and easier to recalibrate. As result, the semi-automatic alignment step provided by the modular calibration method of the invention will allow the user to choose to which elements or part of the element (subsystem) the alignment will be applied, as well as which parameters will come into play at that stage. Obviously, the information maps can be designed in a modular mode so that it takes into account only selected elements of the matrix.

Although the storing process depends to some extent on the data representation and associated pre-processing strategy adopted for building the information maps based on the map files, there are also different strategies for the physical storing if the information. According to a preferred embodiment of the invention, the storage of the information is done locally on each component itself. An auto-discovery feature during the mounting step could then allow to detect and fetch the files corresponding to each component so that those files can be processed during the alignment procedure. According to another embodiment, the storing step can also be performed on a remote storage device, like e.g. a central database, from which as well rough map files and information map sets could be selectively or automatically downloaded in the frame of the alignment step.

Figure 3:
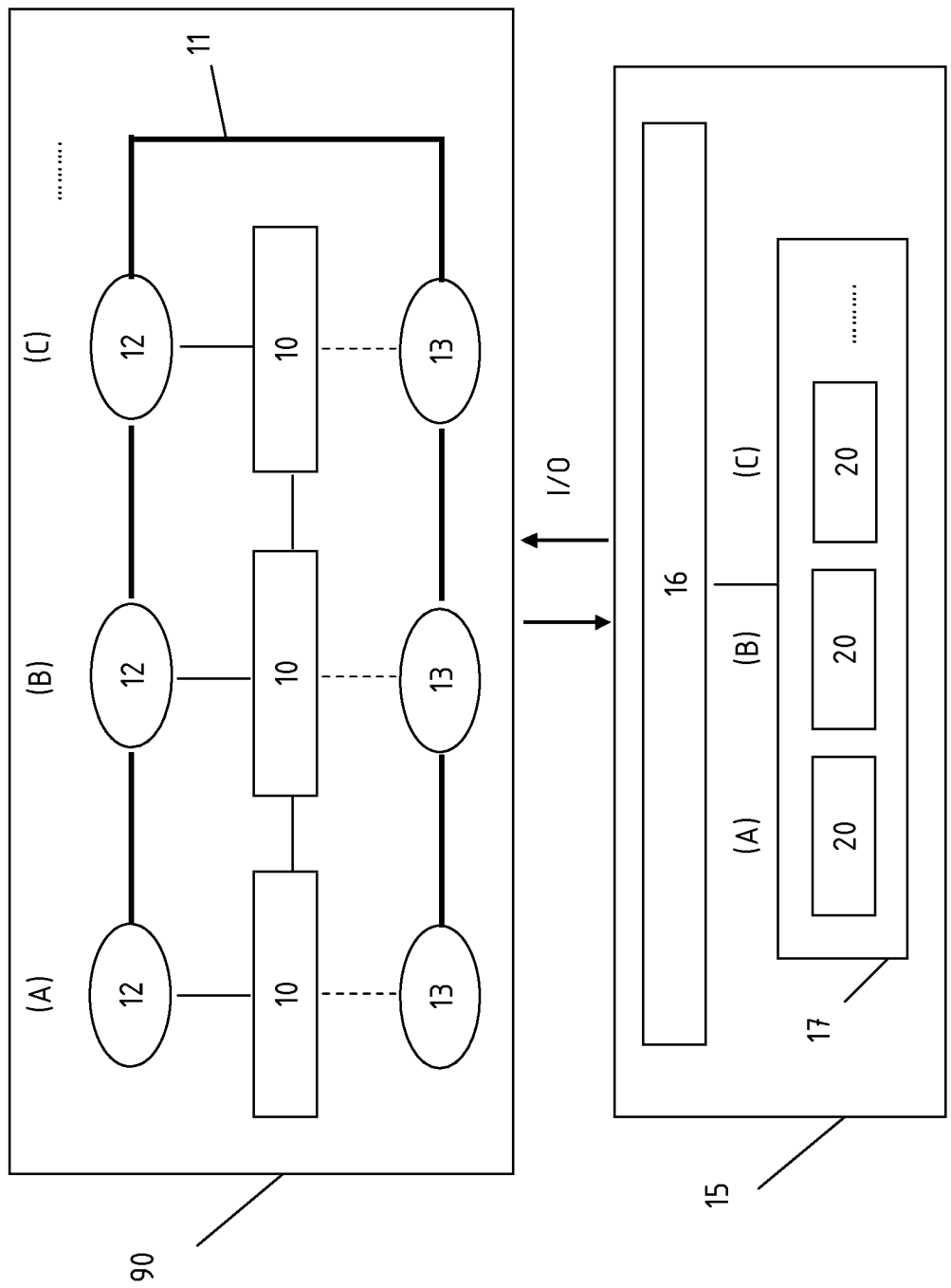
FIG. 3 shows a logical view of a physical system according to a preferred embodiment for the invention.

FIG. 3 shows a logical view of a physical system according to a preferred embodiment for the invention, comprising a CMM 90 and a controller for the CMM 15, linked by a physical input/output (I/O) connection. The CMM comprises a plurality of subsystems 10 distinguished by the letters (A), (B), and (C) arranged in columns and, to which position transducers 12 are coupled for the geometrical mapping and optionally sensors 13, e.g. strain gauges or touch trigger switches, are also coupled. The link between the CMM subsystems and the sensors has been drawn in dotted lines to represent that not all subsytems need be associated with a sensor 13. The invention, however is not limited to the calibration of active elements including position transducers 12 and, indeed, some of the simplest subsystems 10, may be, for example, passive extension elements, without transducers or actuators.

In order for all elements to communicate among each other, a data transfer link, for example a connection bus 11, is also provided.

The CMM controller 15 comprises a processor 16 for carrying out the alignment step, and a memory or storage device 17 for providing all the necessary calibration information to be processed. According to the preferred embodiment of FIG. 3, the memory contains individual map files 20 (A), (B), (C) etc. associated to each respective component 10 (A), (B), (C), etc. The association between the map files 20 and the components should be, however, understood as a logical link, not limitative in terms of physical implementation options. Indeed, many physical embodiments are possible for the storage, as well as for the recognition and retrieval of the associated file.

A computer program can for example be provided with an autodiscovery function for detecting the components and/or retrieve map files 20 before the alignment step is carried out. This can be e.g. through a polling functionality in charge of periodically screening if calibration files are available. Such an autodiscovery function can be associated as well with a tool-changer module (not shown) in order to determine which tools are actually present on the machine, based on port number information.

Although this invention has been described with reference to CMMs, the scope could be broadened to robotics as well as any other suitable industrial domain for which such a modular calibration method is potentially relevant.

The invention claimed is:

1. A modular calibration method for a coordinate measuring system (CMM), said coordinate measuring system comprising a plurality of subsystems, comprising:
preliminary calibration steps (100) prior to a step of mounting said CMM, wherein at least part of said subsystems are individually calibrated (200) and provide specific calibration information (300) for each subsystem, wherein map files (20) are generated and associated with said calibrated subsystem, wherein the map files contain a stiffness mapping of the subsystem allowing derivation of position shifts based on a force applied or on an inertia force;
a step of gathering and storing said calibration information (500), and
a final alignment step (800), wherein said calibration information gathered from said preliminary calibration steps is processed.

2. The method of claim 1, wherein each subsystem corresponds to a degree of freedom of one element of the coordinate measuring system.

3. The method of claim 1, wherein the preliminary calibration steps are carried out at a different site than the final alignment step.

4. The method of claim 1, further comprising a step of organizing said calibration information (400) before storing (500) said calibration information.

5. The method of claim 1, wherein at least one of said subsystems corresponds to a modular component of said coordinate measuring system.

6. The method of claim 1, wherein said storing step is done on separate storage means for each subsystem.

7. The method of claim 6, wherein said storing step (500) is done locally on each component itself.

8. The method of claim 1, wherein said storing step (500) is done on a remote storage device.

9. The method of claim 1, wherein the map files (20) are organized into a matrix.

10. The method of claim 1, wherein the map files associated with each subsystem are combined with a relative positioning reference into a composed and optimized matrix for each component.

11. The method of claim 1, wherein the alignment step (800) is automatic.

12. The method of claim 1, wherein the alignment step (800) is semi-automatic, a user being able to select a single specific calibration parameter which needs to be done.

13. A component of a coordinate measuring system (10), the component being preliminarily calibrated prior to the step of mounting the component in the coordinate measuring system, wherein specific calibration information for the component are stored into a map file associated with the component, the map file contains a stiffness mapping of the component allowing derivation of position shifts based on a force applied or on an inertia force.

* * * * *